(No Model.)
E. WESTON.
TEMPERATURE REGULATOR FOR ELECTRICAL MEASURING INSTRUMENTS.
No. 440,290. Patented Nov. 11, 1890.
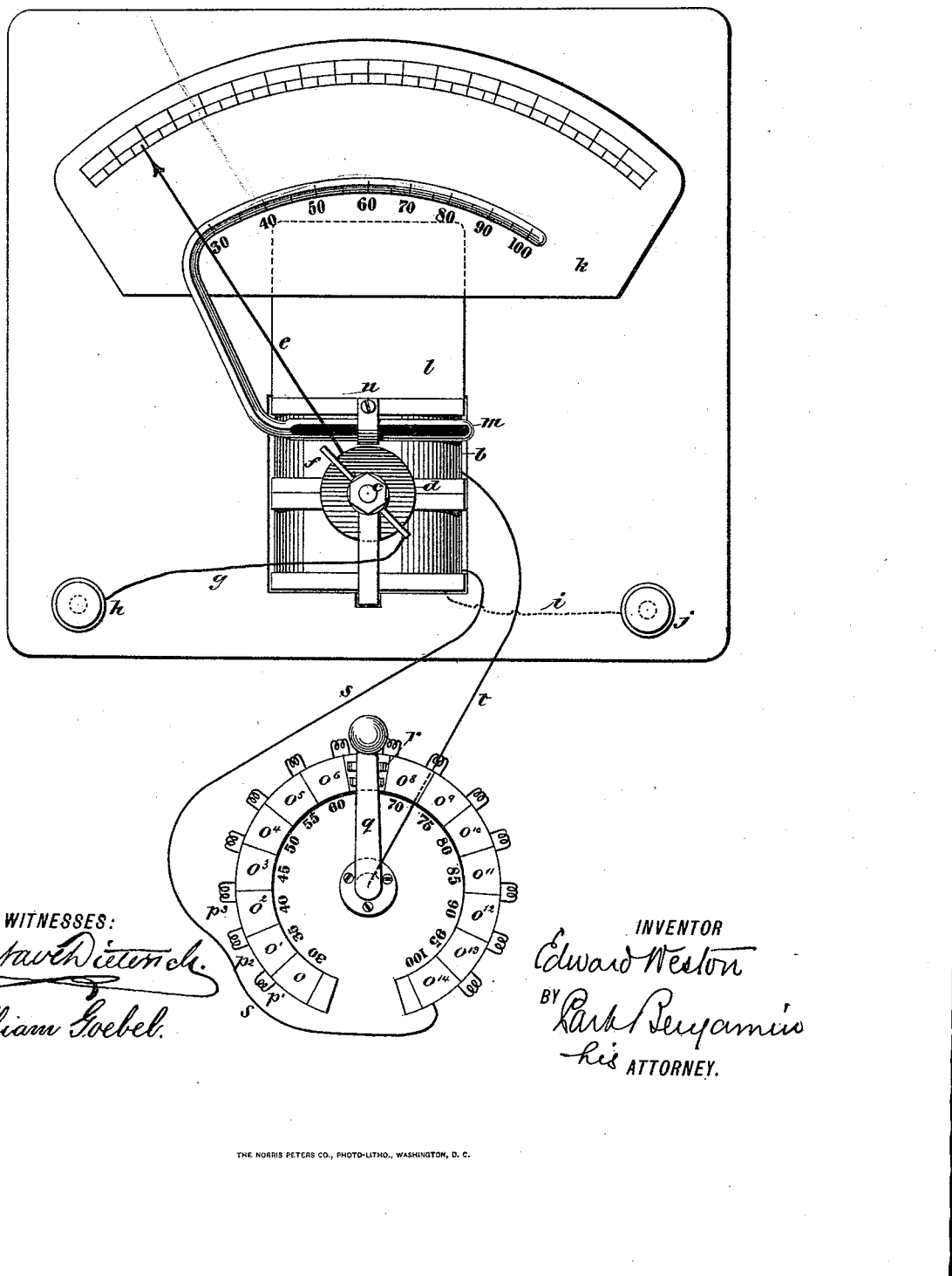
WITNESSES:
Gustav Dieterich
William Goebel.
INVENTOR
Edward Weston
BY Park Benjamin
his ATTORNEY.

UNITED STATES PATENT OFFICE.

EDWARD WESTON, OF NEWARK, NEW JERSEY.

TEMPERATURE-REGULATOR FOR ELECTRICAL MEASURING-INSTRUMENTS.

SPECIFICATION forming part of Letters Patent No. 440,290, dated November 11, 1890.

Application filed June 25, 1890. Serial No. 356,599. (No model.)

*To all whom it may concern:*

Be it known that I, EDWARD WESTON, of Newark, Essex county, New Jersey, have invented a new and useful Improvement in Temperature-Regulators for Electrical Measuring-Instruments, of which the following is a specification.

My invention relates to a device for maintaining constant electrical resistance in the circuit of an instrument despite changes of temperature occurring in said circuit; and it consists in the arrangement of a temperature-indicating apparatus, and also a variable series of resistances in the instrument, which resistances may be adjusted conformably to the indications of the heat-indicating apparatus.

The accompanying drawing shows a plan view of an electrical instrument to which my temperature-regulating device is applied.

The type of instrument here exhibited is fully described and explained by me in another pending application, Serial No. 337,379, filed January 18, 1890, only so much of said instrument being here shown as is necessary to make clear the operation of my present invention.

$a$ is the base-board or bed of the instrument, on which is supported a horizontal coil $b$ of insulated wire. Within this coil is another pivoted coil of insulated wire. (Not shown, but the pivot of which is represented at $c$.) Said pivot carries a disk $d$, to which is secured the index or pointer of the instrument $e$. The bar $f$ is a tightening-bar for a spiral spring, (not shown,) which surrounds the pivot of the inner coil. To one end of said bar $f$ is connected the circuit-wire $g$, which leads to the binding-post $h$. The circuit in the instrument therein proceeds from the binding-post $h$ by wire $g$ to bar $f$, to the coiled spring, (not shown,) to which said bar is connected, thence to the inner and movable coil, (not shown,) thence to the fixed coil $b$, and thence by wire $i$ to the binding-post $j$.

$k$ is a scale-plate supported on a bracket $l$, and marked in any suitable manner for volts or ampères. The coil $b$ and the movable coil therein are electrically connected, so that when a current proceeds between the terminals $h$ and $j$ the inner coil assumes a position dependent upon the difference of potential between said terminals, and therefore the index $e$ connected to said coil moves over the scale, and so allows of the volts and ampères corresponding to said angular displacement of the coil being known.

My present invention has more particular reference to a device for maintaining the electrical resistance in the circuit of the instrument constant despite changes in temperature of coils. If the said coils are made of copper wire, the variations and resistance which they offer due to changes in temperature may be considerable. Thus, for example, the resistance of copper increases at the rate of about two-tenths of one per cent. for every degree Fahrenheit in temperature. Hence an elevation in temperature of but 5° occurring in the coil will increase the resistance offered thereby to the current by one per cent., thus bringing a considerable source of error into the instrument.

In order that variations in temperature may be recognized I provide a thermometer $m$, the mercury reservoir or bulb of which is elongated, and is here shown as curved and fastened directly against the exterior of the coil $b$. It is essential that the thermometer-bulb be placed in proximity to the coil $b$, although not essential that it be arranged exactly as I have here shown. The bulb is secured in place by a strap $n$. The thermometer-tube is bent, as shown, and arranged upon the scale-plate and in a curve parallel to that of the scale-markings. By means of this thermometer the temperature of the coil is shown upon the same scale-plate as the regular indications of the instrument.

$o$ to $o^{14}$ are a series of contacts insulated from one another and disposed in a circle. Between the successive contact-plates are disposed resistance-coils $p'$ $p^2$ $p^3$, &c. Pivoted concentrically with the circle of contact-plates is a switch-arm $q$, having contact-springs $r$, bearing upon the surface of said contact-plates $o$.

The device last described is interposed in the circuit of the fixed coil $b$, and is connected thereto by the wires $s$ $t$. The contact-plates $o$ $o'$, &c., are marked to correspond to the thermometer-scale. Thus the contact-plate $o$ is marked "30" to correspond to the 30° mark of the thermometer, the contact-plate $o'$ corresponds to the 35° mark of the thermometer, the contact-plate $o^2$ corresponds to the 40° mark, and so on, the contact-plate $o^{14}$ corresponding to the 100° mark. When the arm $q$ is placed on the contact-plate $o$, it will be evident that the current in the instrument then passes through all the resistances $p, p', p^2$, and $p^3$. Let it be supposed, merely for purposes of illustration, that this is the starting-point of temperatures. Now, suppose the heat of the coil augments so that the thermometer shows a temperature of 65°. This means an increase of resistance in the coil due to the 65° difference of temperature. In order to compensate for this the switch-arm $q$ is moved around until its contact-spring $r$ rests on the plate $o^7$, marked "65." Seven resistances $p\, p'$ will thus be thrown out of the circuit, and as each resistance $b'\, b^2$ corresponds to the increase of resistance in the coil due to the elevation of 5° of temperature, it follows that by throwing out seven of these resistances we have exactly compensated for the increased resistance of the coil due to its augmented heat. In practical operation, therefore, it is simply necessary to note the indication of the thermometer and place the arm $q$ on the contact-plate mark correspondingly to that indication, in order to keep the resistance of the circuit in the instrument uniform. It will be understood, of course, that the scale of temperatures here given is purely arbitrary, chosen merely for purposes of illustration, and that the number of contact-plates $o\, o'$, &c., here being one for 5° of temperature, may be increased or diminished in number as desired, to correspond, for example, to every 10° change, or for one or even for fraction of degree change. I have also here shown the circle of contact-plates arranged apart from the base-board of the instrument; but in practice they will be conveniently disposed on said base-board.

I claim—

1. In an electrical measuring-instrument, a means of indicating changes in temperature occurring in the instrument-circuit, and connected in said circuit a resistance and a means of varying the same conformably to the indications of said heat-indicating apparatus, whereby the resistance of the whole circuit may be maintained constant despite said temperature variations.

2. In an electrical measuring-instrument, a coil, a means of indicating variations in temperature of said coil and in circuit with said coil a variable resistance.

3. In an electrical measuring-instrument, a coil, a means of indicating variations of temperature of said coil, and in circuit with said coil a variable series of resistances, the said resistances and the said heat-indicating apparatus being provided with correspondingly-marked scales, whereby for a given temperature of coil the corresponding compensating resistance to be removed from or put into circuit may be visually determined.

4. In an electrical measuring-instrument, the combination of the coil $b$, thermometer $m$ in proximity thereto, switch-lever $q$, and a series of resistances $p'\, p^2$, &c., in circuit with said coil.

EDWARD WESTON.

Witnesses:
M. BOSCH,
JAMES T. LAW.